United States Patent
Yang

(10) Patent No.: US 11,799,415 B1
(45) Date of Patent: Oct. 24, 2023

(54) SOLAR ENERGY SYSTEM WITH EFFICIENCY ENHANCEMENT

(71) Applicant: Season Energy Technology Co., Ltd., Tainan (TW)

(72) Inventor: Ching-Chieh Yang, Kaohsiung (TW)

(73) Assignee: Season Energy Technology Co., Ltd., Tainan (TW)

( * ) Notice: Subject to any disclaimer, the term of this patent is extended or adjusted under 35 U.S.C. 154(b) by 0 days.

(21) Appl. No.: 17/884,688

(22) Filed: Aug. 10, 2022

(51) Int. Cl.
*H02S 20/32* (2014.01)
*H02S 40/38* (2014.01)
*H02S 40/32* (2014.01)

(52) U.S. Cl.
CPC .............. *H02S 20/32* (2014.12); *H02S 40/32* (2014.12); *H02S 40/38* (2014.12)

(58) Field of Classification Search
CPC ........... H02S 20/32; H02S 40/32; H02S 40/38
See application file for complete search history.

(56) References Cited

U.S. PATENT DOCUMENTS

| | | | |
|---|---|---|---|
| 2010/0071282 A1* | 3/2010 | Tofflemire | E04B 2/967 52/173.3 |
| 2018/0102733 A1* | 4/2018 | Kakalia | H02S 50/00 |
| 2019/0036478 A1* | 1/2019 | Liu | H02J 7/35 |
| 2020/0395884 A1* | 12/2020 | Brown | H02S 40/36 |

\* cited by examiner

*Primary Examiner* — Jared Fureman
*Assistant Examiner* — Duc M Pham

(57) ABSTRACT

A solar energy system includes at least one solar energy efficiency enhancement device (1), at least one solar power generating device (2), at least one maximum power point tracking device (3), and an electric power storage unit (4). The at least one solar energy efficiency enhancement device includes multiple efficiency enhancing modules (11) each having a capacitor boost element (12), a communication monitoring element (13), a smart control chip element (14), a working time extending element (15), an electricity output element (16), and an electricity management operation element (17). The voltage produced by the at least one solar power generating device is delivered through the capacitor boost element to the electricity output element which outputs an electric power to the at least one maximum power point tracking device which stores the electric power in the electric power storage unit.

4 Claims, 5 Drawing Sheets

US 11,799,415 B1

SOLAR ENERGY SYSTEM WITH EFFICIENCY ENHANCEMENT

BACKGROUND OF THE INVENTION

1. Field of the Invention

The present invention relates to a solar energy system and, more particularly, to a solar energy efficiency enhancement (or improvement) system.

2. Description of the Related Art

A conventional solar energy system 10 in accordance with the prior art shown in FIG. 1 comprises multiple solar power generating devices 101, multiple rectifying inverter devices 20, and an electric power storage unit 30.

Each of the solar power generating devices 101 includes two solar panels 102. The rectifying inverter devices 20 are connected with the solar power generating devices 101 respectively. The electric power storage unit 30 is connected with the rectifying inverter devices 20. In practice, each of the solar panels 102 of each of the solar power generating devices 101 produces a voltage with a maximum value of 40 V. The voltage produced by the solar panels 102 is delivered through the rectifying inverter devices 20 and is stored in the electric power storage unit 30. The electric power stored in the electric power storage unit 30 is converted into an alternating-current voltage which is outputted. Each of the rectifying inverter devices 20 only processes an electric power with a maximum value of 150 W. Thus, the electricity produced by the solar power generating devices 101 is only rectified by the rectifying inverter devices 20 and then stored in the electric power storage unit 30.

However, when the electricity produced by the solar power generating devices 101 is too low, the transformation power of the rectifying inverter devices 20 is too low, so that the rectifying inverter devices 20 cannot be operated normally or easily stop operating. When the electricity produced by the solar power generating devices 101 is too high, the transformation power of the rectifying inverter devices 20 is too high and produce an overload, so that the electricity produced by the solar power generating devices 101 is too much, and the residual electricity cannot be stored in the electric power storage unit 30, thereby causing waste of the electricity. In addition, the rectifying inverter devices 20 are easily damaged due to the overload power.

BRIEF SUMMARY OF THE INVENTION

The primary objective of the present invention is to provide a solar energy system with an efficiency enhancing function.

In accordance with the present invention, there is provided a solar energy system comprising at least one solar energy efficiency enhancement device, at least one solar power generating device, at least one maximum power point tracking device, and an electric power storage unit. The at least one solar energy efficiency enhancement device is connected with the at least one solar power generating device, the at least one maximum power point tracking device, and the electric power storage unit. The at least one solar energy efficiency enhancement device includes multiple efficiency enhancing modules which are connected mutually. Each of the efficiency enhancing modules includes a capacitor boost element, a communication monitoring element, a smart control chip element, a working time extending element, an electricity output element, and an electricity management operation element. The capacitor boost element is connected with the at least one solar power generating device. The at least one solar power generating device includes at least one solar panel. The at least one solar panel produces a voltage with a maximum value of 40 V. The voltage of the at least one solar panel is delivered to the capacitor boost element which outputs a voltage of 5 V to 40 V steadily to the electricity output element. The electricity output element outputs an electric power with a maximum value of 1800 W to the at least one maximum power point tracking device. The at least one maximum power point tracking device gathers and stores the electric power from the electricity output element of each of the efficiency enhancing modules in the electric power storage unit. The communication monitoring element monitors and sets the voltage from the capacitor boost element to the electricity output element at a preset value. When the voltage from the capacitor boost element to the electricity output element is more than the preset value, the working time extending element and the electricity management operation element control extending of an output time of the voltage, and the communication monitoring element controls and connects the smart control chip element with the efficiency enhancing modules so that the smart control chip element and the efficiency enhancing modules cooperate to control the electric power from the electricity output element to the at least one maximum power point tracking device.

According to the primary advantage of the present invention, the voltage produced by the at least one solar panel is delivered to the capacitor boost element which outputs a voltage of 5 V to 40 V steadily to the electricity output element, and the electricity output element outputs an electric power with a maximum value of 1800 W to the at least one maximum power point tracking device.

According to another advantage of the present invention, the at least one maximum power point tracking device gathers and stores the electric power from the electricity output element of each of the efficiency enhancing modules in the electric power storage unit.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
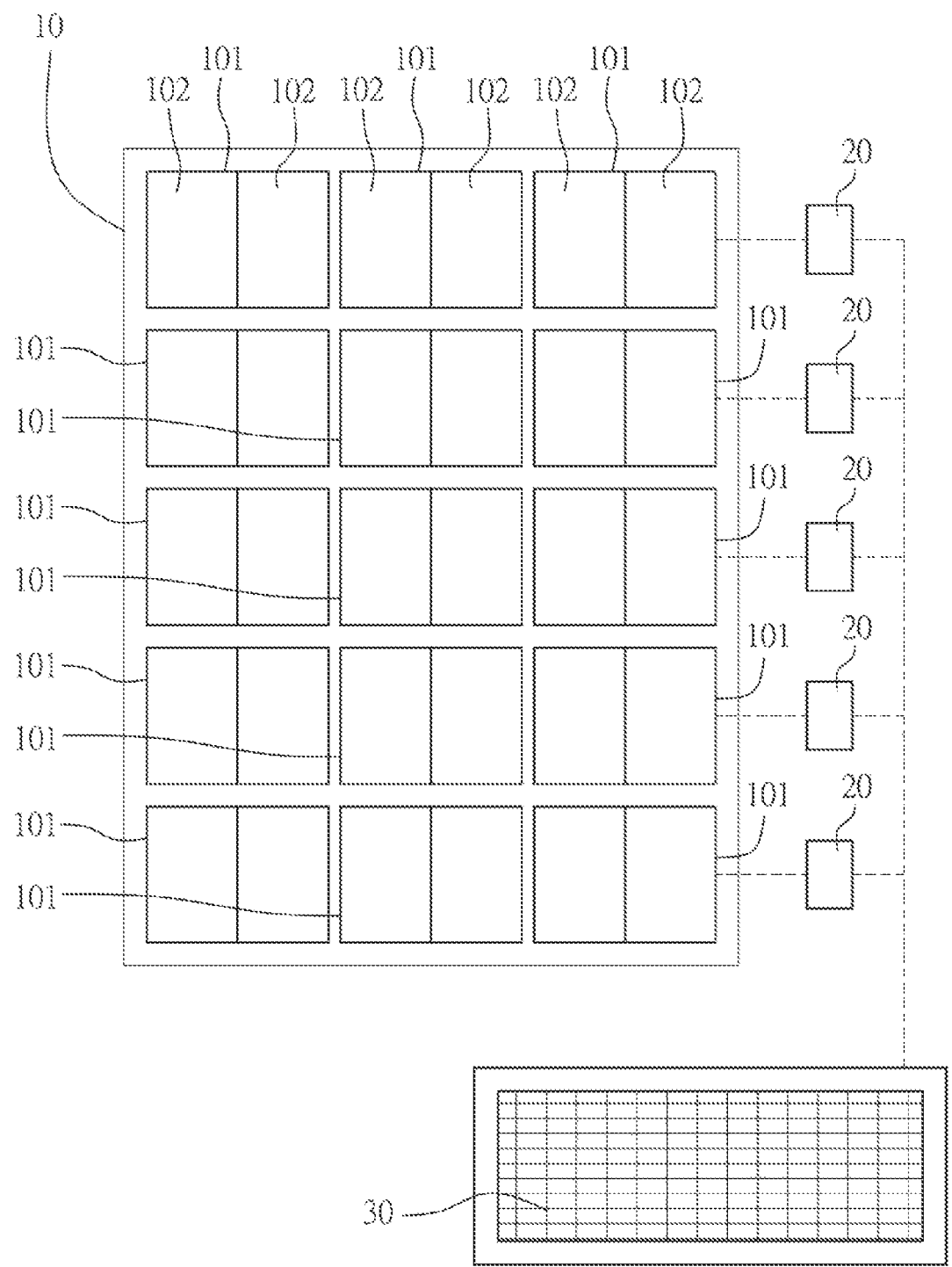
FIG. 1 is a schematic diagram of a conventional solar energy system in accordance with the prior art.
Figure 2:
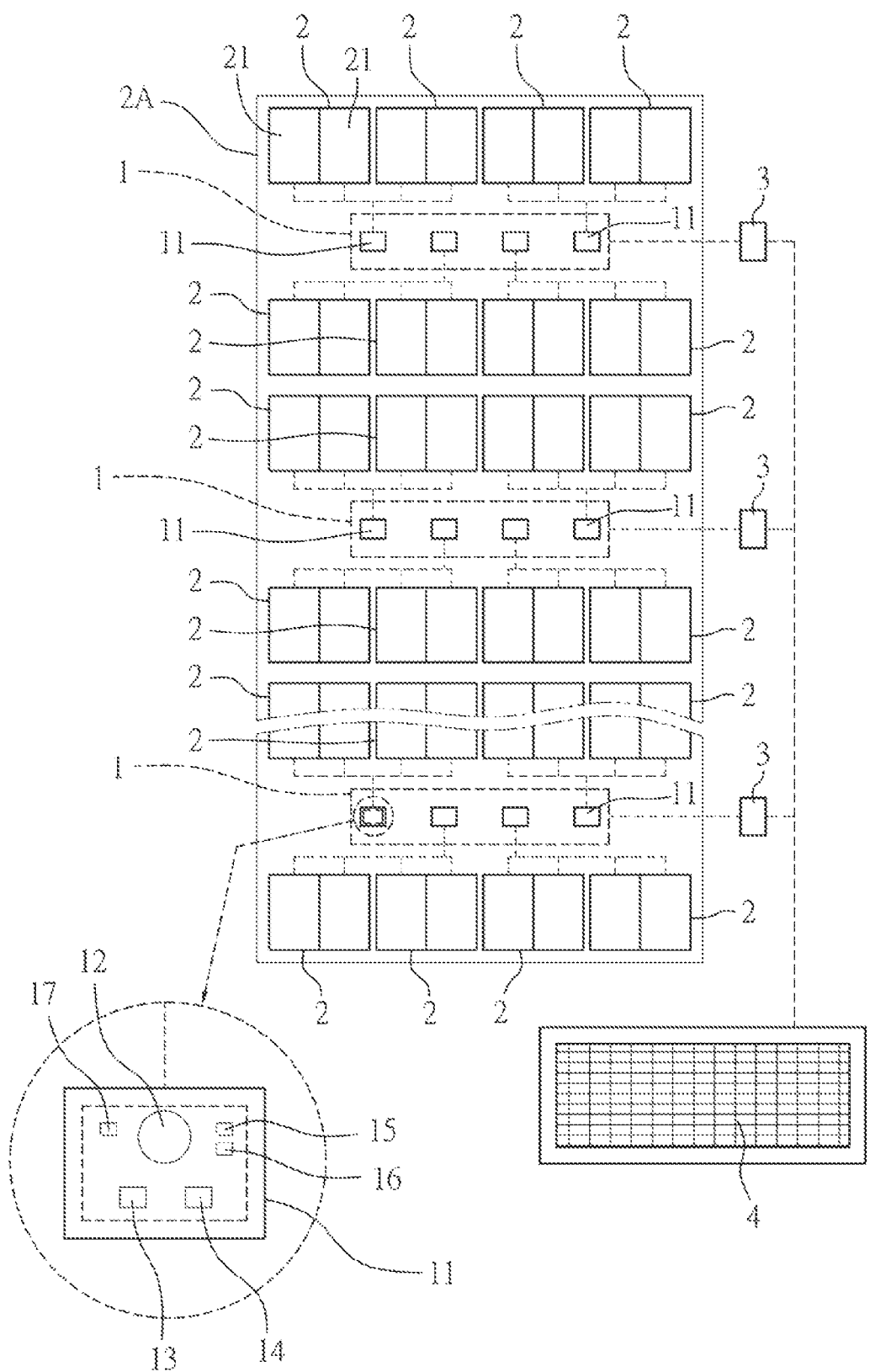
FIG. 2 is a schematic diagram of a solar energy system in accordance with the first preferred embodiment of the present invention.

Referring to the drawings and initially to FIG. 2, a solar energy system 2A in accordance with the preferred embodiment of the present invention comprises at least one solar energy efficiency enhancement device 1, at least one solar power generating device 2, at least one maximum power point tracking device 3, and an electric power storage unit 4.

The at least one solar energy efficiency enhancement device 1 is connected with the at least one solar power generating device 2, the at least one maximum power point tracking device 3, and the electric power storage unit 4.

The at least one solar energy efficiency enhancement device 1 includes multiple (preferably two to twelve) efficiency enhancing modules 11 which are connected mutually. Each of the efficiency enhancing modules 11 includes a capacitor boost (or voltage increase) element 12, a communication monitoring element 13, a smart control chip element 14, a working time extending element 15, an electricity (or electric power) output element 16, and an electricity management operation (or calculation) element 17. The capacitor boost element 12 is connected with the at least one solar power generating device 2. The electricity output element 16 is connected with the capacitor boost element 12. The at least one solar power generating device 2 includes at least one solar panel 21 connected with the capacitor boost element 12. The electric power storage unit 4 is connected with the at least one maximum power point tracking device 3.

In practice, the at least one solar panel 21 produces a voltage with a maximum value of 40 V. The voltage of the at least one solar panel 21 is delivered to the capacitor boost element 12 which outputs a voltage of 5 V to 40 V steadily to the electricity output element 16. The electricity output element 16 outputs an electric power with a maximum value of 1800 W to the at least one maximum power point tracking device 3. The at least one maximum power point tracking device 3 gathers and stores the electric power from the electricity output element 16 of each of the efficiency enhancing modules 11 in the electric power storage unit 4. The communication monitoring element 13 monitors and sets the voltage from the capacitor boost element 12 to the electricity output element 16 at a preset value. When the voltage from the capacitor boost element 12 to the electricity output element 16 is more than the preset value, the working time extending element 15 and the electricity management operation element 17 control extending of an output time of the voltage, and the communication monitoring element 13 controls and connects the smart control chip element 14 with the efficiency enhancing modules 11 so that the smart control chip element 14 and the efficiency enhancing modules 11 cooperate to control the electric power from the electricity output element 16 to the at least one maximum power point tracking device 3.

Figure 3:
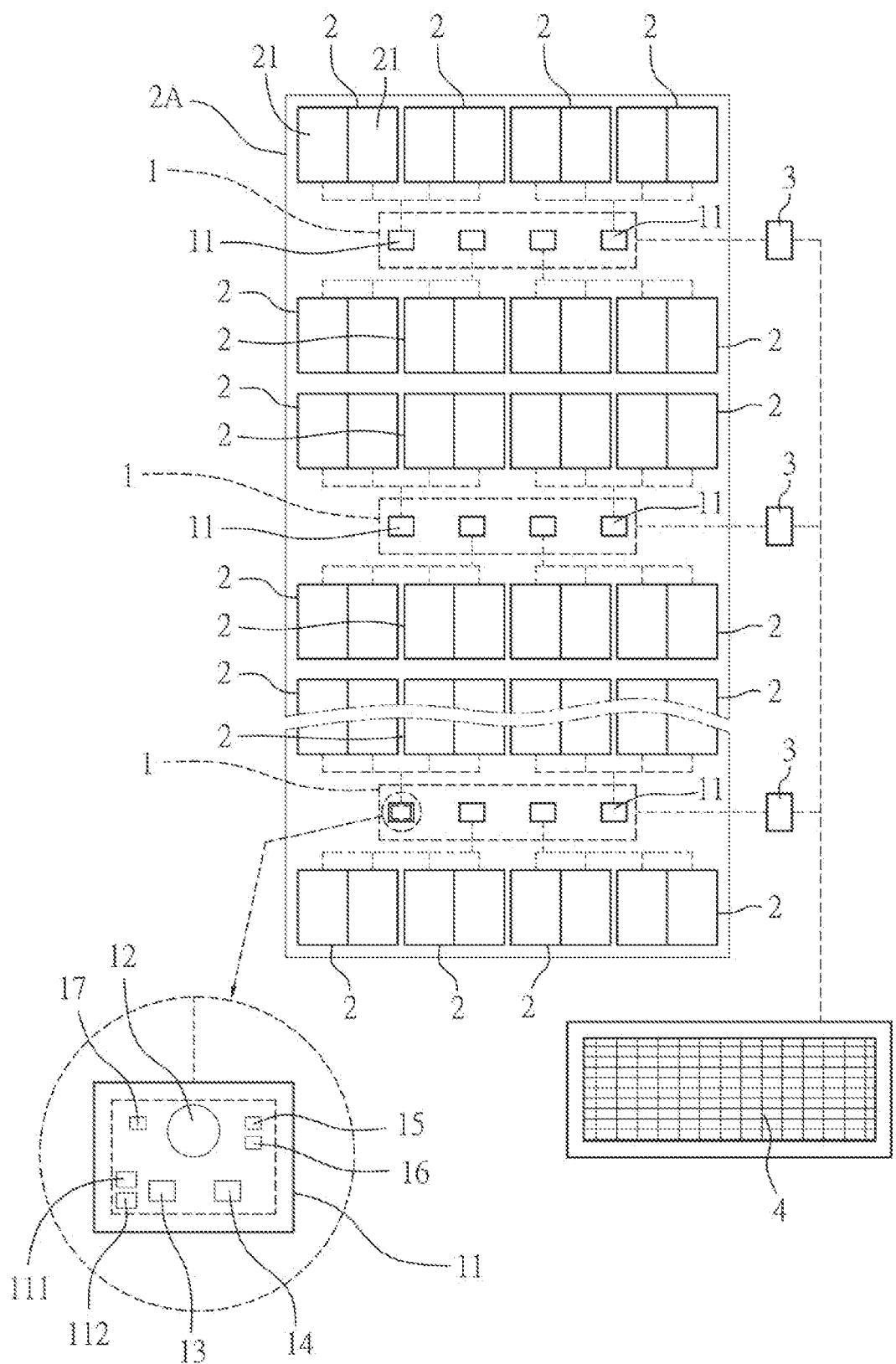
FIG. 3 is a schematic diagram of a solar energy system in accordance with the second preferred embodiment of the present invention.

Referring to FIG. 3, each of the efficiency enhancing modules 11 further includes an intelligent monitoring management element 111 and a solar panel protection inverter (or converter) element 112. The intelligent monitoring management element 111 and the solar panel protection inverter element 112 monitor voltage, output current and temperature of the at least one solar panel 21.

Figure 4:
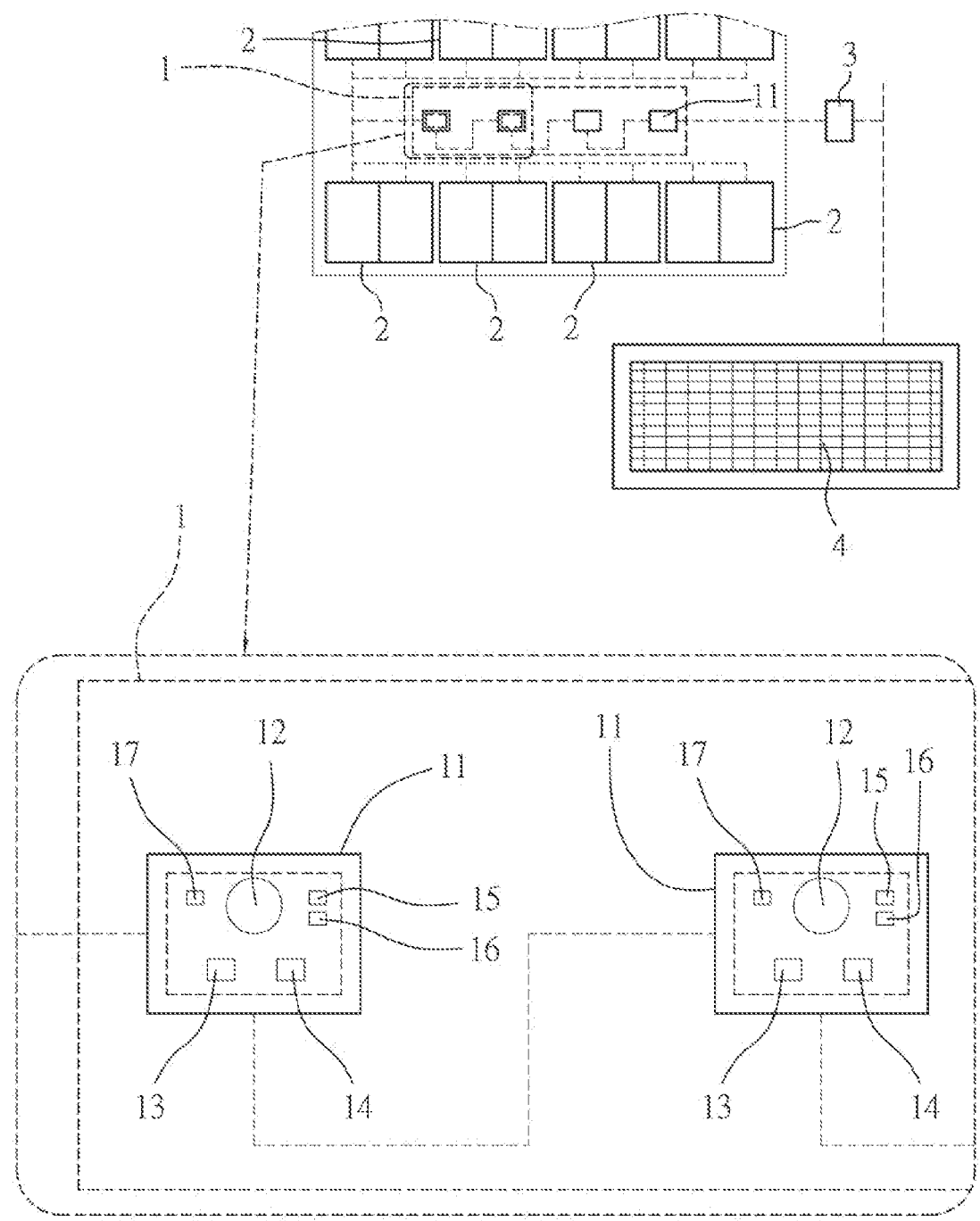
FIG. 4 is a schematic diagram of a solar energy system in accordance with the third preferred embodiment of the present invention.

Referring to FIG. 4, the efficiency enhancing modules 11 of the at least one solar energy efficiency enhancement device 1 are connected serially. The electricity output element 16 of each of the efficiency enhancing modules 11 is connected to the at least one maximum power point tracking device 3. The electric power stored in the electric power storage unit 4 is converted (or inverted) by the at least one maximum power point tracking device 3 into an alternating current which is delivered outward.

Figure 5:
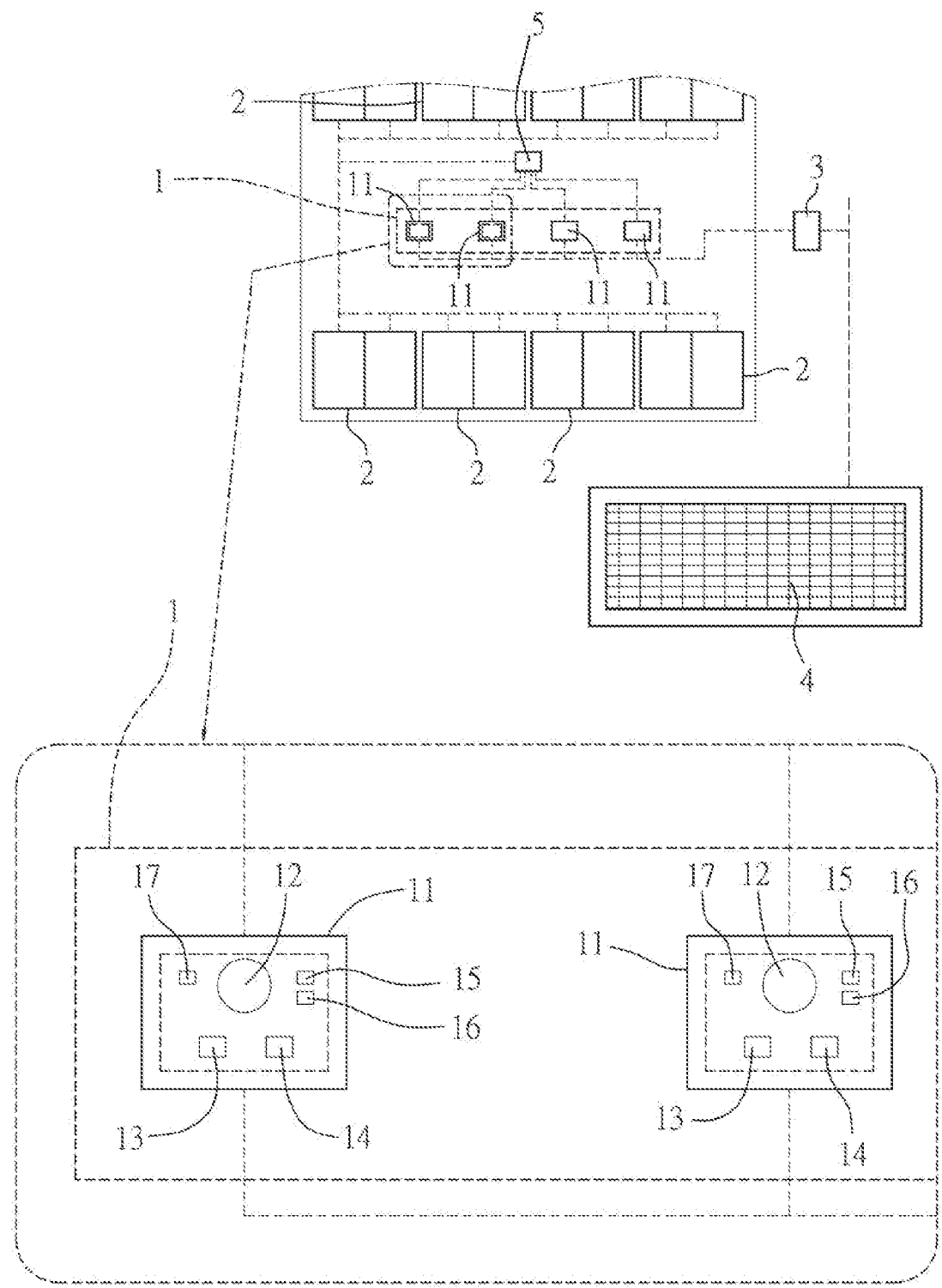
FIG. 5 is a schematic diagram of a solar energy system in accordance with the fourth preferred embodiment of the present invention.

Referring to FIG. 5, the efficiency enhancing modules 11 of the at least one solar energy efficiency enhancement device 1 are connected in parallel. The at least one solar power generating device 2 further includes an adapter 5 connected with the efficiency enhancing modules 11. The adapter 5 is connected with the smart control chip element 14 of each of the efficiency enhancing modules 11. The electricity output element 16 of each of the efficiency enhancing modules 11 is connected to the at least one maximum power point tracking device 3.

In the first advantage of the present invention, the at least one solar energy efficiency enhancement device 1 stabilizes and increases the power conversion (or transformation) rate of the at least one solar panel 21, which is not restricted by the combination mode of the solar panels 21, and not restricted by the specification of the at least one maximum power point tracking device 3. In addition, the electricity output element 16 of each of the efficiency enhancing modules 11 outputs an electric power with a maximum value of 1800 W to the at least one maximum power point tracking device 3, and four of the solar panels 21 produce an electric power with a maximum value of 1700 W so that each of the efficiency enhancing modules 11 is used to safely process the electric power of four solar panels 21. Thus, the electric power produced by the at least one solar panel 21 is delivered by the at least one solar energy efficiency enhancement device 1 to the at least one maximum power point tracking device 3, and the at least one maximum power point tracking device 3 gathers and stores the electric power from the efficiency enhancing modules 11 in the electric power storage unit 4.

In the second advantage of the present invention, the communication monitoring element 13 monitors and sets the voltage from the capacitor boost element 12 to the electricity output element 16 at a preset value, to prevent the electricity from impacting the efficiency enhancing modules 11 and the at least one maximum power point tracking device 3. When the voltage from the capacitor boost element 12 to the electricity output element 16 is more than the preset value, the working time extending element 15 and the electricity management operation element 17 control extending of an output time of the voltage, and the communication monitoring element 13 connects the smart control chip element 14 with the efficiency enhancing modules 11 so that the smart control chip element 14 and the efficiency enhancing modules 11 cooperate to increase the power output to the at least one maximum power point tracking device 3, and the at least one maximum power point tracking device 3 increases the electric power stored in the electric power storage unit 4.

In the third advantage of the present invention, the intelligent monitoring management element 111 and the solar panel protection inverter element 112 monitor the operation condition of the at least one solar power generating device 2 to facilitate maintenance of the at least one solar power generating device 2 and to maintain the generated electricity of the at least one solar panel 21. In addition, the intelligent monitoring management element 111 and the solar panel protection inverter element 112 stop operation of the at least one solar panel 21 temporarily when the output current overloads to prevent the at least one solar panel 21 from being damaged due to overload of the output current. Further, the intelligent monitoring management element 111 and the solar panel protection inverter element 112 stop operation of the at least one solar panel 21 temporarily when the temperature is too high to prevent the at least one solar panel 21 from being damaged due to an excess temperature.

In the fourth advantage of the present invention, the efficiency enhancing modules 11 of the at least one solar energy efficiency enhancement device 1 are connected serially, with the electricity output element 16 of each of the efficiency enhancing modules 11 being connected to the at least one maximum power point tracking device 3. When the voltage from the capacitor boost element 12 to the electricity output element 16 is more than the preset value, the working time extending element 15 and the electricity management operation element 17 control extending of the output time of the voltage, and the communication monitoring element 13 connects the smart control chip element 14 with the efficiency enhancing modules 11 so that the smart control chip element 14 and the efficiency enhancing modules 11 cooperate to control the electric power from the electricity output element 16 to the at least one maximum power point tracking device 3. In addition, the electric power stored in the electric power storage unit 4 is converted by the at least one maximum power point tracking device 3 into an alternating current which is outputted for an electric supply.

In the fifth advantage of the present invention, the efficiency enhancing modules 11 of the at least one solar energy efficiency enhancement device 1 are connected in parallel, with the electricity output element 16 of each of the efficiency enhancing modules 11 being connected to the at least one maximum power point tracking device 3. The adapter 5 is connected with the smart control chip element 14 of each of the efficiency enhancing modules 11. When the voltage from the capacitor boost element 12 to the electricity output element 16 is more than the preset value, the working time extending element 15 and the electricity management operation element 17 control extending of the output time of the voltage, and the communication monitoring element 13 inform the smart control chip element 14 to connect the adapter 5 with the efficiency enhancing modules 11 so that the adapter 5 and the efficiency enhancing modules 11 cooperate to control the electric power from the electricity output element 16 to the at least one maximum power point tracking device 3.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. A solar energy system comprising:
at least one solar energy efficiency enhancement device (1), at least one solar power generating device (2), at least one maximum power point tracking device (3), and an electric power storage unit (4);
wherein:
the at least one solar energy efficiency enhancement device is connected with the at least one solar power generating device, the at least one maximum power point tracking device, and the electric power storage unit;
the at least one solar energy efficiency enhancement device includes multiple efficiency enhancing modules (11) which are connected mutually;
each of the efficiency enhancing modules includes a capacitor boost element (12), a communication monitoring element (13), a smart control chip element (14), a working time extending element (15), an electricity output element (16), and an electricity management operation element (17);
the capacitor boost element is connected with the at least one solar power generating device;
the at least one solar power generating device includes at least one solar panel (21);
the at least one solar panel produces a voltage with a maximum value of 40 V;
the voltage of the at least one solar panel is delivered to the capacitor boost element which outputs a voltage of 5 V to 40 V steadily to the electricity output element;
the electricity output element outputs an electric power with a maximum value of 1800 W to the at least one maximum power point tracking device;
the at least one maximum power point tracking device gathers and stores the electric power from the electricity output element of each of the efficiency enhancing modules in the electric power storage unit;
the communication monitoring element monitors and sets the voltage from the capacitor boost element to the electricity output element at a preset value; and
when the voltage from the capacitor boost element to the electricity output element is more than the preset value, the working time extending element and the electricity management operation element control extending of an output time of the voltage, and the communication monitoring element controls and connects the smart control chip element with the efficiency enhancing modules so that the smart control chip element and the efficiency enhancing modules cooperate to control the electric power from the electricity output element to the at least one maximum power point tracking device.

2. The solar energy system as claimed in claim 1, wherein:
each of the efficiency enhancing modules further includes an intelligent monitoring management element (111) and a solar panel protection inverter element (112); and
the intelligent monitoring management element and the solar panel protection inverter element monitor voltage, output current and temperature of the at least one solar panel.

3. The solar energy system as claimed in claim 1, wherein:
the efficiency enhancing modules of the at least one solar energy efficiency enhancement device are connected serially;
the electricity output element of each of the efficiency enhancing modules is connected to the at least one maximum power point tracking device; and
the electric power stored in the electric power storage unit is converted by the at least one maximum power point tracking device into an alternating current which is delivered outward.

4. The solar energy system as claimed in claim 1, wherein:
the efficiency enhancing modules of the at least one solar energy efficiency enhancement device are connected in parallel;
the at least one solar power generating device further includes an adapter (5) connected with the efficiency enhancing modules;
the adapter is connected with the smart control chip element of each of the efficiency enhancing modules; and
the electricity output element of each of the efficiency enhancing modules is connected to the at least one maximum power point tracking device.

* * * * *